(12) United States Patent
Thomas et al.

(10) Patent No.: US 8,447,692 B2
(45) Date of Patent: May 21, 2013

(54) PERSONAL FINANCIAL NETWORK (75) Inventors: Susan S. Thomas, Gastonia, NC (US);
William F. Borowski, Millbury, MA (US); Kazi M. Ariff, Quincy, MA (US);
Carol A. Smith, Edgartown, MA (US);
Judith M. Anderson, East Walpole, MA (US); Steven K. Hayes, Bemus Point, NY (US); Thomas D. Kelley, Hingham, MA (US); Neal G. Wolfson, Lexington, MA (US); Sean M. O'Connor, Scituate, MA (US); Russell W. Tipper, Boston, MA (US); Jeffrey P. Judd, Boston, MA (US); William J. Aheron, Charlotte, NC (US); Yicong Li, Lexington, MA (US);
Shane A. Johnson, Charlotte, NC (US);
James P. Kirkman, Acton, MA (US);
Jeffrey H. Bierer, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 929 days.

(21) Appl. No.: 12/407,877

(22) Filed: Mar. 20, 2009

(65) Prior Publication Data
US 2010/0241546 A1 Sep. 23, 2010

(51) Int. Cl.
*G06Q 40/00* (2012.01)
(52) U.S. Cl.
USPC .............................................. 705/42; 705/39

(58) Field of Classification Search
USPC ........................................ 705/26, 25, 39, 42
See application file for complete search history.

(56) References Cited

U.S. PATENT DOCUMENTS

| | | | |
|---|---|---|---|
| 7,184,979 B1 * | 2/2007 | Carson | 705/35 |
| 7,945,512 B2 * | 5/2011 | Scipioni et al. | 705/39 |
| 2007/0203829 A1 * | 8/2007 | Polanco | 705/39 |
| 2007/0282729 A1 | 12/2007 | Carpenter et al. | |
| 2008/0109412 A1 | 5/2008 | Drayer et al. | |
| 2008/0110980 A1 | 5/2008 | Hogg et al. | |
| 2008/0275817 A1 * | 11/2008 | Scipioni | 705/42 |
| 2008/0281721 A1 * | 11/2008 | Simunovic | 705/26 |

OTHER PUBLICATIONS

International Search Report for International Application PCT/US10/26459.

\* cited by examiner

*Primary Examiner* — Samica L Norman
(74) *Attorney, Agent, or Firm* — Weiss & Arons LLP; Michael Springs (57) ABSTRACT

Apparatus and methods for providing a personal financial network service are provided. The method may use an electronic information processing platform. The method may include storing information relating to a first participant account. The method may also include storing information relating to a second participant account. The systems and methods of the invention may further include storing information relating to a group of accounts containing the first participant and the second participant account, wherein first said account and second said account are stored independently of one another.

26 Claims, 7 Drawing Sheets

PERSONAL FINANCIAL NETWORK

FIELD OF TECHNOLOGY

Aspects of the disclosure relate to systems and methods for offering a financial service. Specifically, the invention relates to offering a financial networking service.

BACKGROUND OF THE INVENTION

Some financial institutions provide systems and methods to help families administer to their financial assets. In such systems and methods, one or two family members are authorized to control the funds involved. Such systems and methods are costly and complicated to run. Consequently, the family is typically a high net worth family to qualify for this service.

Thus, middle class families do not have access to such a service to administer their finances. It would therefore be desirable to provide systems and methods wherein an average family or self-defined group is able to link together their financial accounts to simplify administering to their financial affairs.

Additionally, some financial institutions provide systems and methods for offering products and services to customers with significant assets. This qualification limits the ability of the financial institution to provide these products and services to individual customers who do not possess the required funds.

It would be desirable to provide systems and methods wherein a financial institution can offer products and services to a customer who is ineligible to receive them based on his personal assets.

SUMMARY OF THE INVENTION

A method for providing a personal financial network service is disclosed. The method may use an electronic information processing platform. The method may include storing, in a computer memory, information relating to a first participant account. The method may further include storing information relating to a second participant account. Information relating to the accounts of three or more participants may be stored as well. The method may also include storing information relating to a group of accounts, the group of accounts including the first participant account and the second participant account. Information relating to the group of accounts may be stored without the storing including storing instructions to combine the accounts together into a single account. The method may further include using a processor. The processor may be used to calculate a sum of total deposited funds within the group of accounts. The method may include determining whether the group of accounts meets a threshold. The threshold may be characterized by a sum of total deposited funds within the group of accounts. The sum of total deposited funds within the group of accounts may include participant-invested funds. When the threshold is met, the method may include modifying an eligibility status of at least one of the participants. The eligibility status of at least one of the participants may relate to the personal financial network service.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

In systems and methods according to the invention, a system may be created that provides a personal financial network service. The method may include storing information relating to a first participant account, i.e., an account of a first participant that is to be included in the personal financial network. The method may further include storing information relating to a second participant account.

The systems and methods of the invention may also include storing information relating to a group of accounts. The group of accounts may contain the first participant account and the second participant account. The accounts contained in the group of accounts may be accounts at the same financial institution.

Information may also be stored relating to two or more accounts of a single participant. The participant accounts may be one or more checking accounts, savings accounts, investment accounts, or a combination of accounts.

The participants of the personal financial network may be family members, friends, employees, a financial advisor and his advisee, or any other suitable participants and/or combination of participants. Additionally, the participants of the personal financial network may be affiliated with one or more organization, business, institution and/or group that is suitable to participate in the services provided by the systems and methods of the invention.

It should be noted that a personal financial network service may be provided to three or more participants. It should additionally be noted that a participant may participate in multiple personal financial networks simultaneously.

The systems and methods of the invention may include providing questions and options during the initiation and/or duration of the personal financial network. The questions and options may be provided to one or more of the participants of the personal financial network. The questions and options may relate to the personal financial network, a participant birth date, place of residence, contact information, financial accounts and/or financial history. In addition, the questions and options may relate to participant transactions, loans, matching of deposits, bill paying, the calculation of a threshold and/or any other suitable information.

The questions and options may be displayed to a participant of the personal financial network via an electronic interface. The questions and options may also be provided to the participant in person by a banking representative or in hardcopy. It should be noted that the questions and options provided to two or more participants may differ. Alternatively, all participants may be provided with similar questions and options.

One or more participants of the personal financial network may provide selections and/or answers to some or all of the questions and options provided. The selections and/or answers may be provided by a participant during the initiation and/or duration of the personal financial network. A participant authorized representative, in addition to a banking representative, may provide selections and answers on behalf of the participant as well. The participant may provide selections, answers and any other suitable information, such as signatures and biometric identification, in person at a financial institution, telephonically, online, or via a completed form. Selections and answers may be provided by the participants of the personal financial network individually and/or together as a group.

Selections and answers provided by the participant during the initiation and/or duration of the personal financial network may be modified. The participant or a participant authorized representative may modify the selections and answers of the participant. Modification of the participants' selections and answers may be supported throughout the participants' participation in the personal financial network. The modification may be executed online, electronically, telephonically, in writing and/or in a bank. The method(s) of modification available to the participant may depend on the information being modified.

During the initiation and/or duration of the personal financial network, a participant may provide selections and/or answers relating to one or more participant accounts to be included in the group of accounts.

The selections and/or answers of the participant may relate to a participant account and/or funds in participant account maintained in a second financial institution. The participant may select to transfer funds maintained in the second financial institution to a first financial institution. The first financial institution may be a financial institution in which the participant desires to create, or has created, a personal financial network. The participant may authorize the first financial institution to transfer the participant funds from the second financial institution to the first financial institution on his behalf.

The participant may additionally select a circumstance that triggers the termination of the participants' participation in the personal financial network. For example, death, the onset of a terminal illness, divorce, or a financially-related event may be selected to trigger the automatic withdrawal of the participant from the personal financial network. In addition, the financial institution supporting the personal financial network may stipulate an event that triggers the withdrawal of a participant from the personal financial network.

A first participant participating in the personal financial network may authorize a second participant to view a first participant account. The first participant may authorize the second participant to view some or all of the first participant's transaction information, balance information, history logs, dashboards, status reports, or any other suitable information that relates to the first participant account.

A first participant may further authorize a second participant to execute transactions into, out of, or within the first participant account. The transaction privileges of the second participant may include bill paying, automatic matching of deposits, automatic transfers, or any other suitable transacting privileges.

It should be noted that a first participant may authorize a second participant to execute viewing and/or transacting privileges in multiple first participant accounts. The authorized viewing and/or transacting privileges of the second participant may differ with respect to each first participant account.

It should additionally be noted that a first participant may authorize multiple participants to execute viewing and/or transacting privileges with respect to one or more first participant accounts. In this embodiment, the first participant may select the level of accessing permissions of each participant with respect to the first participant account(s).

The second participant may execute his authorized transacting and/or viewing privileges with respect to the first participant account(s) via a telephone banking service, online, at an automated banking machine, or in person at a financial institution.

The second participant may further select to authorize the first participant to execute viewing and/or transacting privileges in one or more second participant accounts.

The systems and methods of the invention may further include determining a threshold. The threshold may be calculated electronically or by a banking representative. The threshold may be characterized by an amount of funds contained in some or all the group of accounts, the credit history of one or more of the participants in the group of accounts, a combination of the aforementioned characterizations and/or any other suitable information relating to the personal financial network service. It should be noted that characteristics of the threshold may be predetermined or personalized by a banking representative. The determination of the threshold may be based, at least in part, on a calculation involving predetermined factors.

The threshold may be calculated during initiation of the personal financial network. The threshold may also be calculated in response to a selection executed by one or more participants. In this embodiment, the participant(s) may be notified of the option of determining a threshold, whereupon they may select to initiate the determination. Calculation of the threshold may also be initiated upon the occurrence of a predetermined event.

Once the threshold has been calculated the calculation may be updated weekly, monthly, yearly or at any other time. In addition, the threshold may be recalculated any time data relating to the threshold calculation has been modified. For example, the threshold may be recalculated in the event of a withdrawal of a participant from the personal financial network.

Information relating to one or more participants in the personal financial network may be included in the calculation of the threshold. The information may relate to deposited and/or invested funds of a participant, participant credit history, or any other suitable participant information.

Participant information may be automatically included in the calculation of the threshold. Alternatively, the participant may select to include his information in the calculation of the threshold. In one embodiment of the invention, one or more participants may select a second participant for whom they desire their participant information to be used in a threshold calculation relating to the second participant. For example, a mother and father may include their credit history in a threshold calculation for their son. If the threshold is met, the son's credit status may be improved.

In the embodiment wherein a first participant is participating simultaneously in multiple personal financial networks, information from the multiple personal financial networks may be used in calculating a threshold relating to the first participant. Alternatively, select information from the multiple personal financial networks may be used in calculating the threshold relating to the first participant.

A first participant may sign a form, select an option, give verbal consent, electronically indicate and/or provide other suitable authorization and/or information before first participant information is included in the calculation of the threshold. The information and/or authorization(s) provided by the first participant may include accepting a measure of responsibility with respect to the product/service to be granted to the second participant(s) when the threshold is met.

For example, a father may authorize his credit history to be used in calculating a threshold for his son. When the threshold is met, his son may be approved for additional credit to be added to his credit card. The father may authorize his checking account to be charged the interest charges of his son's credit card in the event that his son has not made his monthly payments.

The systems and methods of the invention may include a second participant being granted a product/service and/or a preferred pricing for a product/service based on a threshold calculation including information of a first participant. In one embodiment of the invention, first participant credit history may be affected by the second participants' usage of the product/service that was granted to the second participant via a threshold calculation including first participant information. Alternatively, the first participant may be unaffected by the second participants' usage of the product/service granted to the second participant via a threshold calculation including first participant information.

The systems and methods of the invention may include providing a participant with the ability to withdraw his participant information from the threshold calculation. The participant information may be withdrawn in response to a selection made by the participant and/or the withdrawal of the participant from the personal financial network. In addition, the participant information may be withdrawn from the threshold calculation upon the occurrence of a predetermined event selected by the participant. The predetermined event may relate to a second participant misusing a service and/or product granted to him based on a threshold calculation including the first participants' information.

In one embodiment, the participant may withdraw his participant information at any time. In an alternative embodiment, the participant may withdraw his participant information before or after a predetermined event or time span.

When a predetermined threshold is met, the eligibility status of one or more of the participants with respect to a product and/or service may be modified. The modification may enable the participant to receive one or more products, services, preferred pricing of products and/or preferred pricing of services that he was ineligible to receive based on his personal financial information.

In one embodiment of the systems and methods of the invention, the participant eligibility status may be modified after the threshold is met. In an alternative embodiment, the eligibility status of the participant may be modified after the threshold has been satisfied for a predetermined length of time.

In addition, modification of the eligibility status of the participant may be based on the participant satisfying predetermined conditions. The predetermined conditions may relate to participant credit history, account balances, age, the time span within which the participant has participated in the personal financial network service and any other suitable information.

Initiation of the personal financial network may include one or more participants providing selections and answers to questions and options. Initiation of the personal financial network may additionally include some or all of the participants (or participant-authorized representatives) providing one or more signatures, notarizations, biometric identification or any other suitable information. The participants may also agree to conditions stipulated by the financial institution supporting the personal financial network.

The participants may provide the selections, answers and other relevant information online, in person, telephonically, or via a completed form. The method(s) available to the participants for providing the selections, answers and other relevant information may vary based on the properties of the personal financial network to be established. The properties of the personal financial network may include the funds involved, the permissions to be granted to the participants and the eligibility statuses to be modified.

Initiation of the personal financial network may further include authorizing a participant to become a group leader. The group leader may be authorized to access a master account. The master account may automatically include all accounts in the group of accounts. Alternatively, the participants may choose which participant accounts the group leader may be authorized to access. Furthermore, the participants may determine and/or select the authorized access of the group leader with respect to their participant accounts. The group leader may receive reports pertaining to the financial activity of the accounts he is authorized to access.

During initiation, the group of accounts may be pre-coded with a group identifier. The group identifier may be displayed on some or all of the communications between the financial institution supporting the personal financial network and the participants. In addition, the group identifier may be displayed on relevant web pages, bank statements, electronic accounts, or in any other suitable location.

Initiation of the personal financial network may also include a master account agreement. The master account agreement may be signed by the participants of the personal financial network. The master account agreement may state the group leader, if applicable, and the authorized permissions of the participants.

Upon completion of the initiation of the personal financial network, a participant online bank account may be modified. The modification may enable the participant to execute his authorized accessing privileges. The modification may further include displaying information relating to the personal financial network, the participant accounts involved, a history log of group activity and any other suitable information. The participant electronic account may be assigned a group number, allowing the account to be viewed and reported on as part of the group of accounts.

The participants of the personal financial network may be notified of the initiation of the personal financial network. The notification may be executed via e-mail, an automated telephone call, a welcome kit, a paper notice, or any other suitable method. The notification may describe to a first participant the first participant accounts included in the group of accounts. The notification may also describe the permissions of the first participant with respect to a second participant account. Rights, privileges, group responsibilities, terms and conditions may be included in the notification, as well as a sample report of how the group was established and will run.

In the embodiment wherein initiation of the personal financial network includes calculating a threshold, a first participant eligibility status may be modified. In this embodiment, the first participant may be notified of his modified status.

The first participant may authenticate his identity using a group code, password, biometric identification or any other suitable information. Upon authentication, the first participant may access the personal financial network.

The systems and methods of the invention may include authorizing a new participant to join an existing personal financial network. The method of authorizing a new participant to join an existing personal financial network may be selected by the participants during initiation of the personal financial network. Alternatively, the method of authorizing a new participant may be predetermined.

In the embodiment wherein the systems and methods of the invention include a group leader, the group leader may authorize the new participant to join the personal financial network. In an alternative embodiment, a new participant may be authorized to join an existing personal financial network when all participants consent to his addition. In an additional embodiment, the participants may use a voting module to determine the authorization status of the new participant with respect to the existing personal financial network.

The systems and methods of the invention may include methods for communication between the participants of the personal financial network. The systems and methods of the invention may further include methods for a first participant to lend and/or transfer funds to one or more participants in the personal financial network. The systems and methods of the invention may also include methods for communicating between the financial institution supporting the personal financial network and the participants. These communications and transactions may be enabled via a participant online bank account, a webpage dedicated to a personal financial network, by a bricks-and-mortar financial institution, via e-mail, hardcopy or at an automatic banking machine.

The systems and methods of the invention may include methods of communication between a first participant and a second participant. The methods of communication may include chat, virtual voting, electronic sticky notes, posted comments or any other desirable method of communication.

The systems and methods of the invention may further include authorizing a first participant to lend funds to a second participant. The first participant may select the account in which the second participant is to deposit the repaid funds. The first participant may further select the loan's interest rate. The first participant may also select one or more time spans after which the selected interest rate of the loan is to be automatically changed to an alternative interest rate. The interest rate of the loan may further vary according to the progress of the second participant towards repaying the loan. In one embodiment, the interest accrued by the loan may be deposited in a first participant account, second participant account, or any other suitable account selected by the first participant. The systems and methods of the invention may also include the first participant changing selected information pertaining to the loaned funds.

The systems and methods of the invention may also include one or more participants co-signing a loan and/or mortgage on behalf of a second participant.

A tracking module may be used to track the progress of the second participant towards repaying the loan. The module may display a graphical user interface (GUI) that can be viewed by some or all of the participants of the personal financial network.

The first participant may select funds to be withdrawn from one or more first participant accounts and deposited in one or more second participant accounts. The first participant may further select an event that triggers an automatic withdrawal of funds from a first participant account and deposits them in a second participant account. For example, a father may choose to automatically match the funds his son deposits into his savings account. Additionally, funds withdrawn from the first participant account may pay some or all of a bill, fee or any other amount of funds charged to a second participant. The funds may be withdrawn automatically and/or on a recurring basis. The second participant may be notified of the selection(s) of the first participant. The notification may be personalized by the first participant.

The systems and methods of the invention may include transmitting information pertaining to the personal financial network to a first participant. The information may relate to first participant accounts included in the group of accounts, the account(s) of a second participant within which the first participant has been granted authorized access and any other information relevant to the progress, events and transactions of the participants and/or the accounts contained group of accounts. In addition, the first participant may be provided with legal forms and/or reports pertaining to first participant funds contained in the group of accounts.

The information may be communicated to the first participant via a history log, tracking module, dashboard, record keeping, quarterly review, statement, report, notification, or any other desirable method(s) of communication. In the embodiment wherein the personal financial network includes a group leader, the group leader may receive a master report. The master report may include information pertaining to all the accounts included in the group of accounts.

A financial institution supporting a personal financial network may send advertisements, promotions, advice and/or any other desired information to a participant participating in the personal financial network. A participant may also receive communications from a banking representative electronically or in person. A teleconference with a banking representative and the participants of the personal financial network may be offered by the systems and methods of the invention.

The systems and methods of the invention may also include a jointly-titled group account. One or more participants of the personal financial network may be authorized to deposit funds in the jointly-titled group account.

The funds in the jointly-titled group account may be invested. The participants may authorize a first participant to invest the funds in the group account. The participants may further specify the investment vehicles to be used by the first participant when investing the funds.

In one embodiment, information pertaining to the group account and an authorized first participant may be provided during initiation of the personal financial network. Alternatively, a voting module may be used to authorize the first participant. In the embodiment wherein the systems and methods of the invention include a group leader, the group leader may be authorized to select the first participant.

The profits accrued by the invested funds may be distributed to one or more of the participants in the personal financial network. The participants who have invested funds in the jointly-titled group account may select the personal financial network accounts in which their accrued profits are to be deposited. The distribution of the profits may relate to the amount of funds a participant invested in the group account, information provided by a participant during initiation of the personal financial network service or any other suitable information.

The profits accrued by the invested funds, the investment vehicles used and/or any other information relevant to the funds in the group of accounts may be displayed to one or more of the participants of the personal financial network.

It should be noted that first participant funds deposited in the group of accounts may accrue interest and/or other suitable proceeds. Some or all of the proceeds accrued by the first participant funds may be distributed to one or more participants in the group of accounts. The first participant may select the participant account(s) in which select first participant proceeds are to be deposited.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
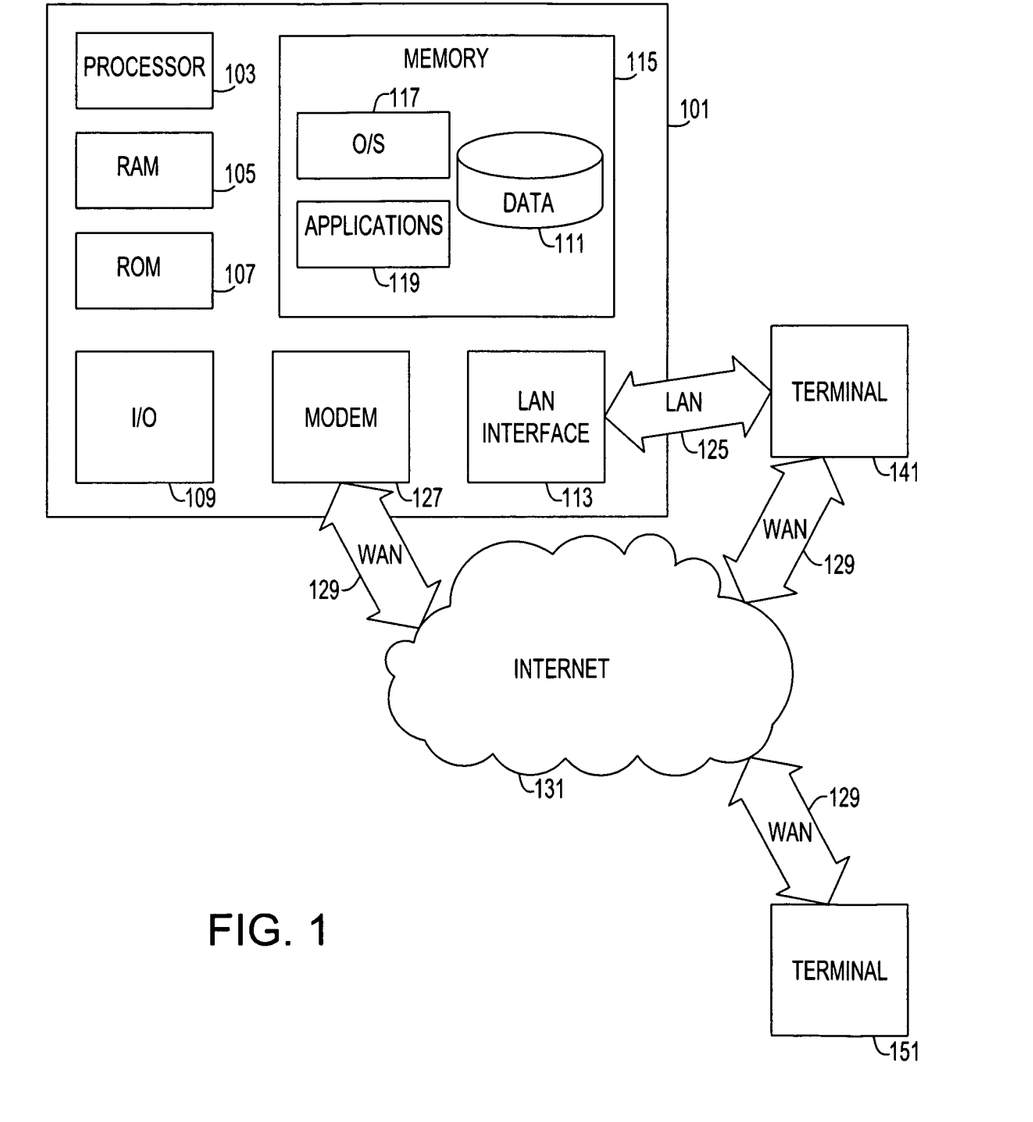
FIG. 1 is a schematic diagram of apparatus that may be used in accordance with the principles of the invention.

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 125.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 125 and/or storage to provide instructions to processor 103 for enabling server 101 to perform various functions. For example, memory 125 may store software used by server 101, such as an operating system 117, application programs 119, and an associated database 121. Alternatively, some or all of server 101 computer executable instructions may be embodied in hardware or firmware (not shown). As described in detail below, database 121 may provide storage for participant information; personal financial network information, and/or any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages via the World Wide Web from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

A terminal such as 141 or 151 may be used by an administrator to open, view and process participant information and to issue one or more instructions regarding the personal financial network service. Participant information may be stored in memory 125. The participant information may be processed by an application such as one of applications 119.

Figure 2:
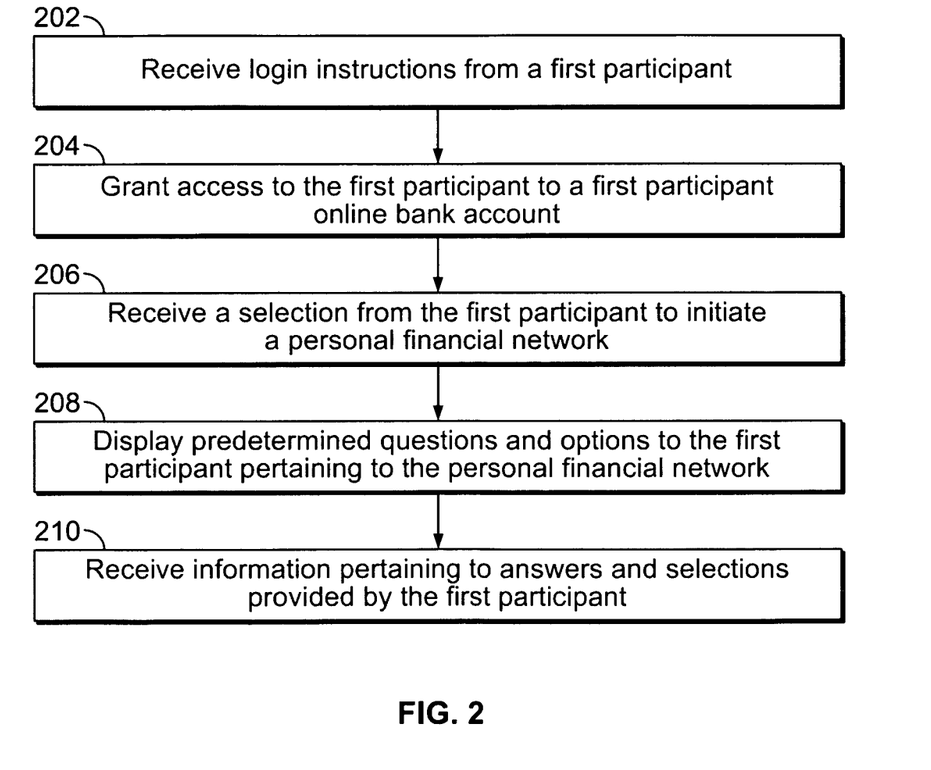
FIG. 2 shows an illustrative flow diagram of a process for initializing a personal financial network service.

FIGS. 2-5 show flow diagrams that describe in detail a process according to the invention. FIG. 2 shows an illustrative flow diagram of a process for initializing a personal financial network service. In step 202 login instructions may be received from a first participant. In step 204 the first participant may be granted access to a first participant online bank account. A selection may be received from the first participant to initiate a personal financial network in step 206. In step 208 predetermined questions and options pertaining to the personal financial network may be displayed to the first participant. Information pertaining to selections and answers provided by the first participant may be received in step 210.

Figure 3:
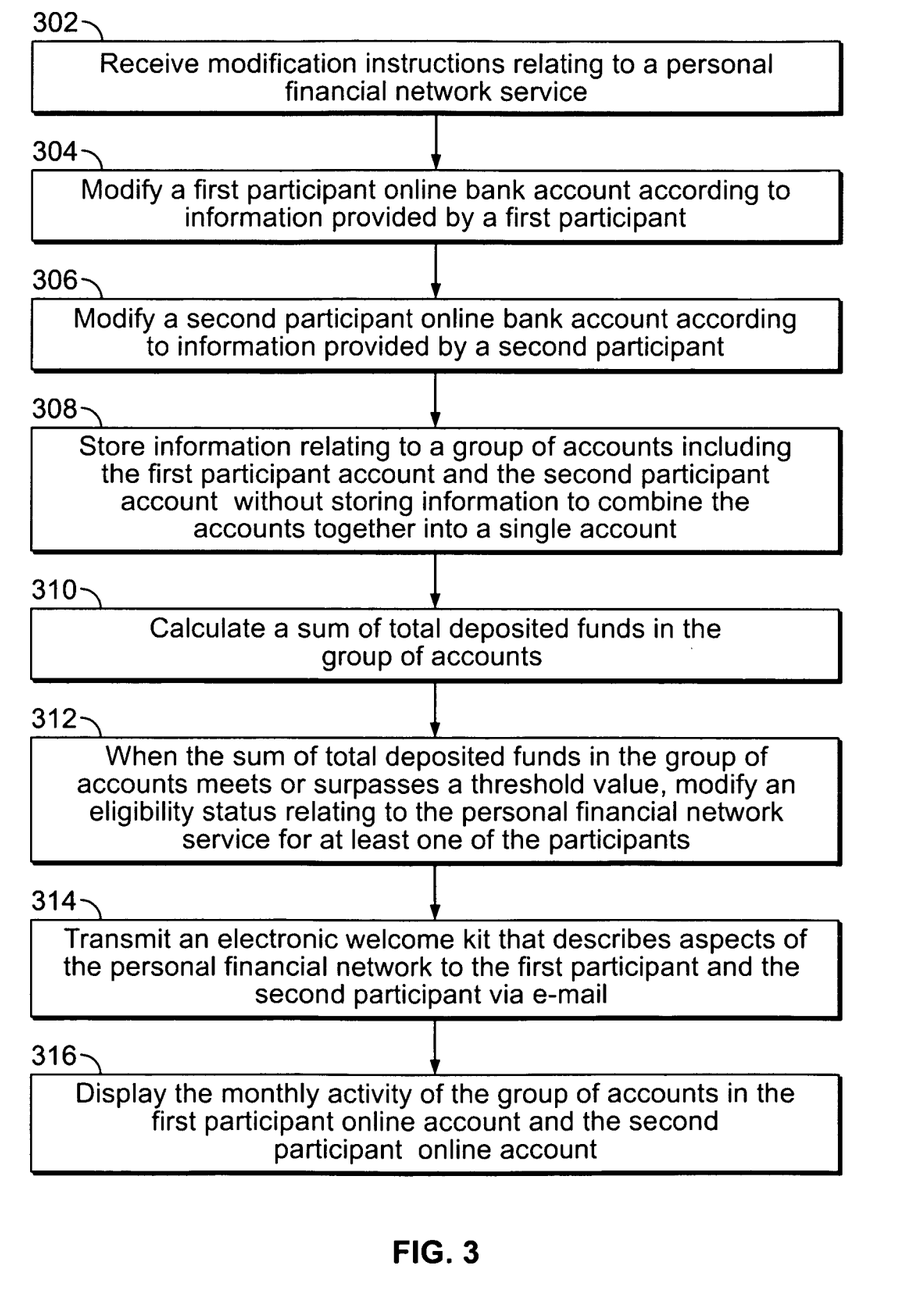
FIG. 3 shows an illustrative flow diagram of a process for modifying an online participant account to support a personal financial network service.

FIG. 3 shows an illustrative flow diagram of a process for modifying an online participant account to support a personal financial network service. In step 302 modification instructions relating to a personal financial network may be received. In step 304 a first participant online bank account may be modified according to information provided by a first participant. In step 306 a second participant online bank account may be modified according to information provided by a second participant. In step 308 information relating to a group of accounts including the first participant account and the second participant account may be stored. The information relating to the group of accounts may be stored without storing information to combine the accounts together into a single account. In step 310 a sum of total deposited funds in the group of accounts may be calculated. In step 312 an eligibility status relating to the personal financial network service may be modified for at least one or the participants. The eligibility status relating to the personal financial network may be modified when the sum of total deposited funds in the group of accounts meets or surpasses a threshold value. In step 314 an electronic welcome kit that describes aspects of the personal financial network may be transmitted to the first participant and the second participant via e-mail. In step 316 the monthly activity of the group of accounts may be displayed in the first participant online account and the second participant online account.

Figure 4:
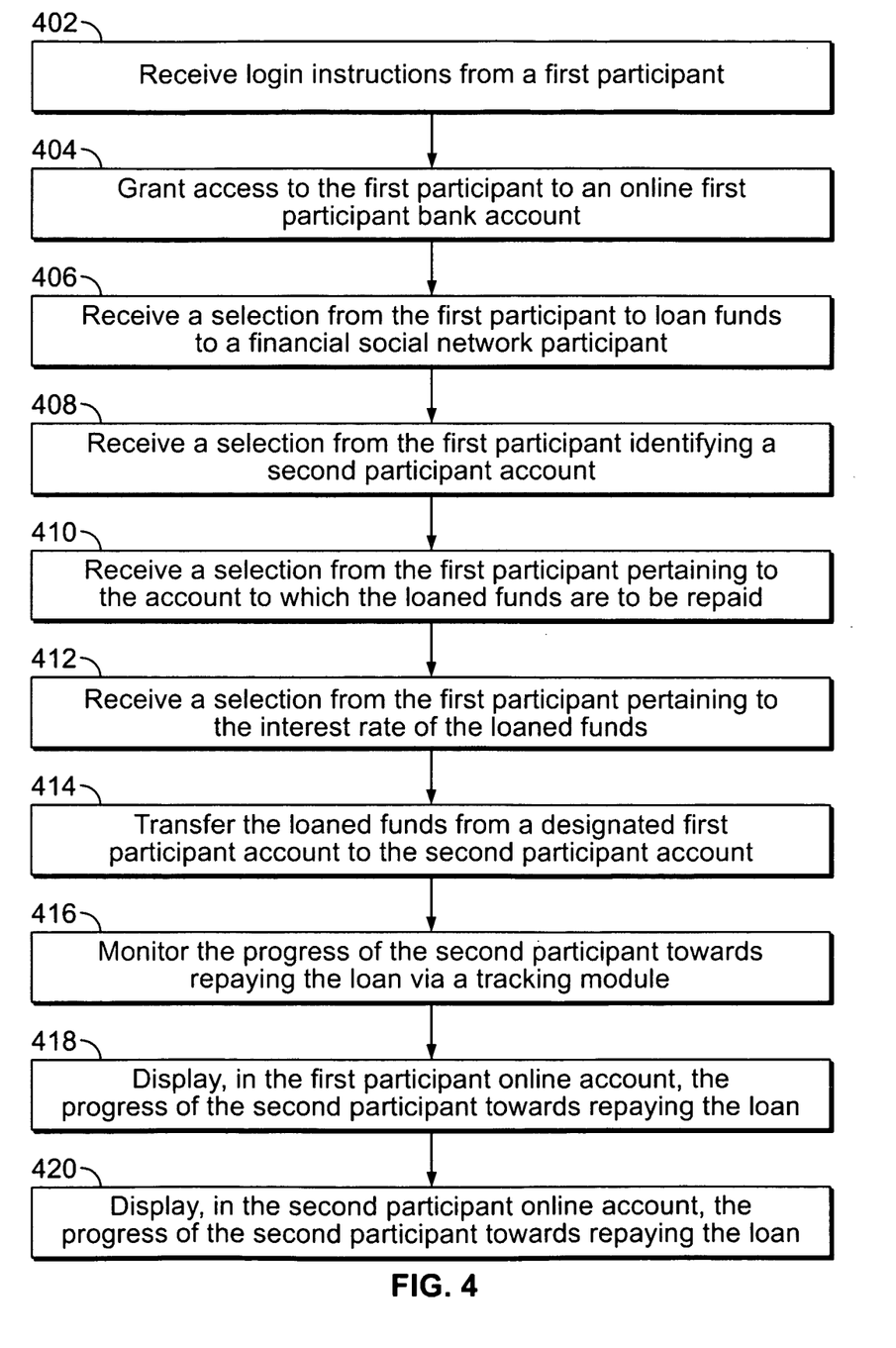
FIG. 4 shows a detailed flow diagram of an illustrative personal financial network process.

FIG. 4 shows a detailed flow diagram of an illustrative personal financial network process. Login instructions may be received from a first participant in step 402. The first participant may be granted access to an online first participant bank account in step 404. In step 406 a selection may be received from the first participant to loan funds to a financial social network participant. In step 408 a selection may be received from the first participant identifying a second participant account. A selection from the first participant pertaining to the account to which the loaned funds are to be repaid may be received in step 410. A selection from the first participant pertaining to the interest rate of the loaned funds may be received in step 412. In step 414 the loaned funds may be transferred from a designated first participant account to the second participant account. In step 416 the progress of the second participant towards repaying the loan may be monitored via a tracking module. In step 418 the progress of the second participant towards repaying the loan may be displayed in the first participant account. In step 420 the progress of the second participant towards repaying the loan may be displayed in the second participant account.

Figure 5:
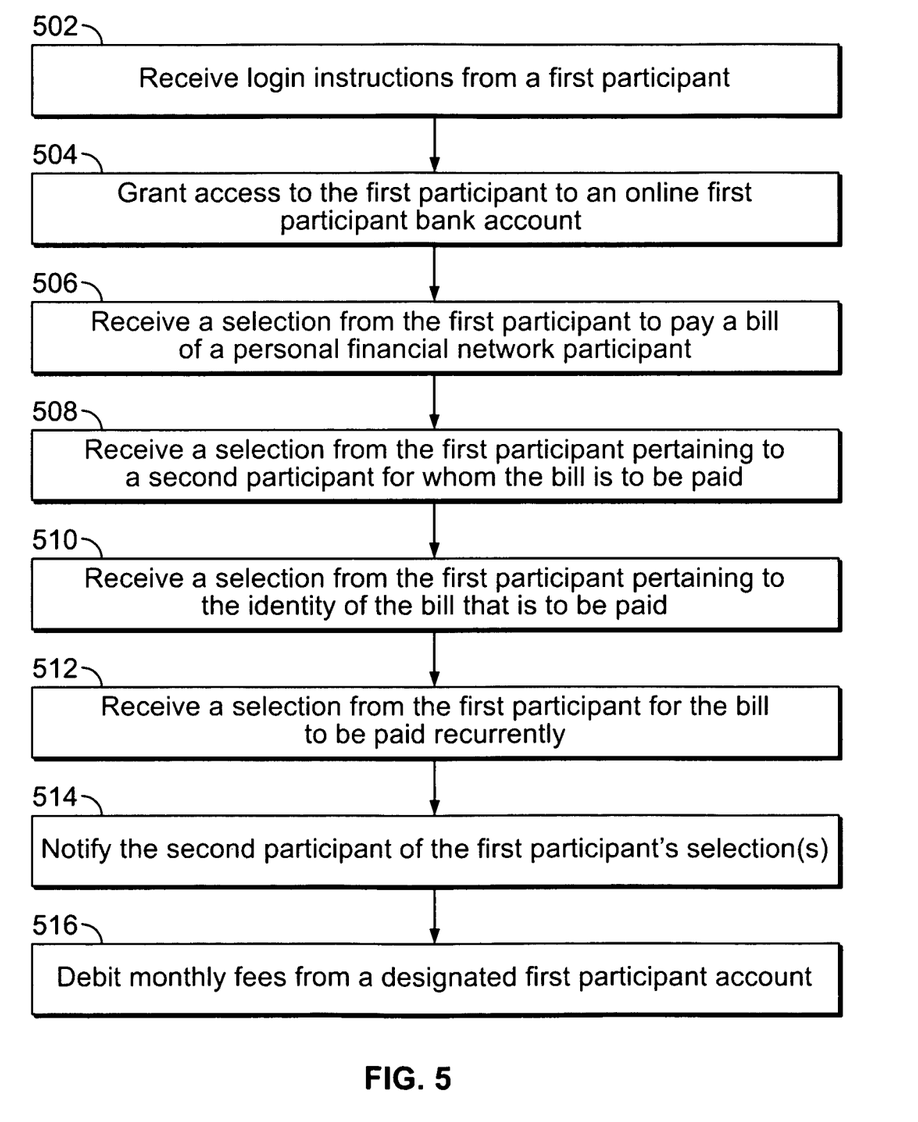
FIG. 5 shows a detailed flow diagram of another illustrative personal financial network process.

FIG. 5 shows a detailed flow diagram of an illustrative personal financial network process. In step 502 login instructions may be received from a first participant. In step 504 the first participant may be granted access to a first participant online bank account. In step 506 a selection may be received from the first participant to pay a bill of a personal financial network participant. A selection may be received from the first participant pertaining to a second participant for whom the bill is to be paid in step 508. A selection may be received from the first participant pertaining to the identity of the bill that is to be paid in step 510. In step 512 a selection may be received from the first participant for the bill to be paid recurrently. In step 514 the second participant may be notified of the first participant's selection(s). In step 516 monthly fees may be debited from a designated first participant account.

Figure 6:
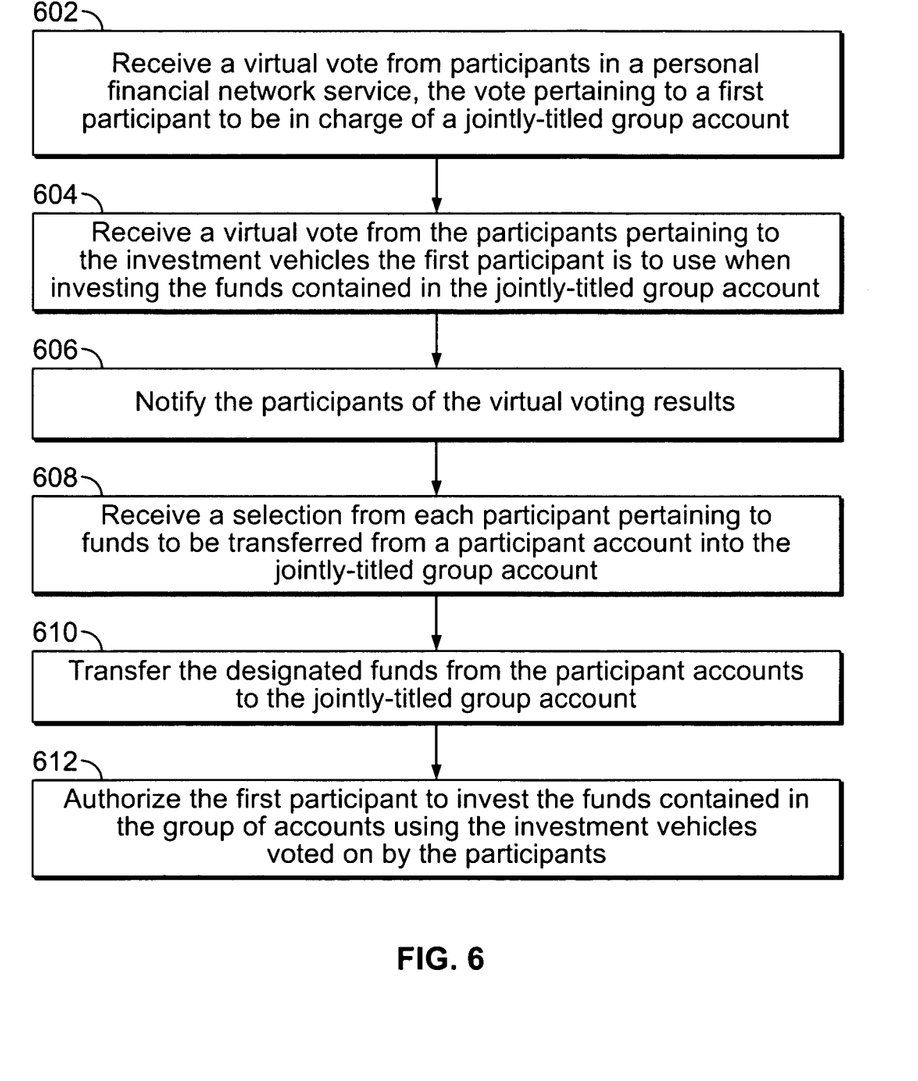
FIG. 6 shows a detailed flow diagram of yet another illustrative personal financial network process.

FIG. 6 shows a detailed flow diagram of an illustrative personal financial network process. In step 602 a virtual vote may be received from participants in a personal financial network. The virtual vote may pertain to a first participant to be in charge of a jointly-titled group account. In step 604 a virtual vote may be received from the participants pertaining to the investment vehicles the first participant is to use when investing the funds contained in the jointly-titled group account. In step 606 the participants may be notified of the virtual voting results. In step 608, a selection may be received from each participant pertaining to funds to be transferred from a participant account into the jointly-titled group account. The designated funds may be transferred from the participant accounts to the jointly-titled group account in step 610. The first participant may be authorized to invest the funds contained in the group of accounts using the investment vehicles voted on by the participants in step 612.

Figure 7:
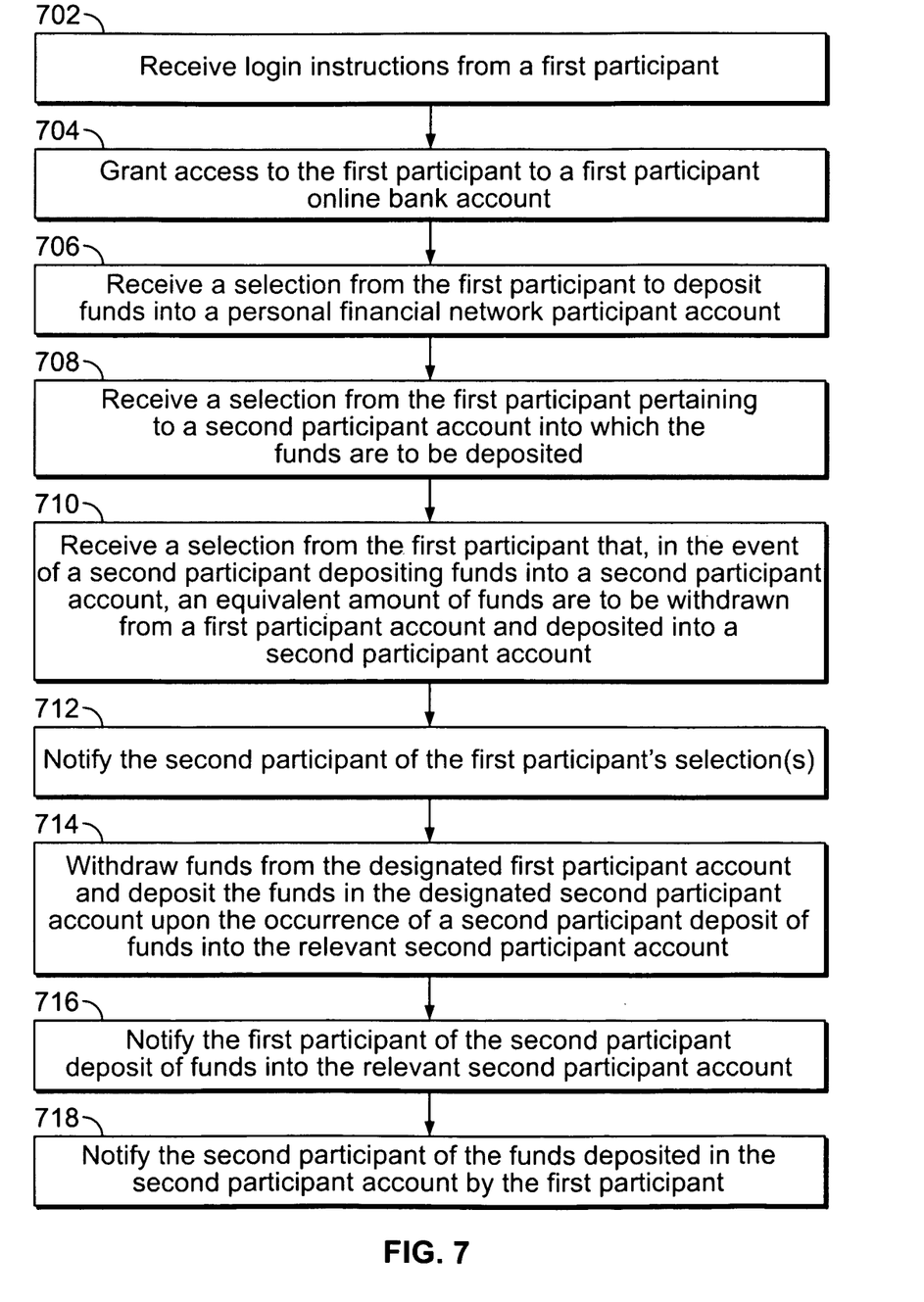
FIG. 7 shows a detailed flow diagram of yet another illustrative personal financial network process.

FIG. 7 shows a detailed flow diagram of an illustrative personal financial network process. In step 702, login instructions may be received from a first participant. In step 704, the first participant may be granted access to a first participant online bank account. A selection may be received from the first participant to deposit funds into a personal financial network participant account in step 706. A selection may be received from the first participant pertaining to a second participant account into which the funds are to be deposited in step 708. In step 710 a selection may be received from the first participant that, in the event of a second participant depositing funds into a second participant account, an equivalent amount of funds are to be withdrawn from a first participant account and deposited into a second participant account. In step 712 the second participant may be notified of the first participant's selection(s). In step 714 funds may be withdrawn from the designated first participant account and deposited in the designated second participant account. This transaction may be executed upon the occurrence of a second participant deposit of funds into the relevant second participant account. The first participant may be notified of the second participant deposit of funds into the relevant second participant account in step 716. The second participant may be notified of the funds deposited in the second participant account by the first participant in step 718.

Thus, systems and methods for providing a personal financial network service have been provided. Persons skilled in the art will appreciate that the present invention can be practiced by other than the described embodiments, which are presented for purposes of illustration rather than of limitation, and that the present invention is limited only by the claims that follow.

What is claimed is:

1. One or more non-transitory computer-readable media storing computer-executable instructions which, when executed by a processor on a computer system, perform a method for providing a personal financial network service to a first participant and a second participant, the method using an electronic information processing platform, the computer-executable instructions comprising:
   a first set of instructions for storing information relating to a first participant account at a financial institution;
   a second set of instructions for storing information relating to a second participant account at the financial institution;
   a third set of instructions for storing information relating to a group of accounts at the financial institution, the group of accounts including the first participant account and the second participant account, without the storing including storing instructions to combine the accounts together into a single account;
   a fourth set of instructions for using a processor to calculate a sum of total deposited funds within the group of accounts;
   a fifth set of instructions for determining whether the group of accounts meets a threshold sum of total deposited funds within the group of accounts;
   a sixth set of instructions for modifying an eligibility status of at least one of the participants, the eligibility status relating to the personal financial network service, when the threshold is met;
   a seventh set of instructions for withdrawing a participant account from the group of accounts, wherein the ability of the group of accounts to meet the threshold is reevaluated after the participant account is withdrawn; and an eighth set of instructions for terminating the inclusion of a participant account in the group of accounts, the termination triggered by an event selected from the group of death of the participant, divorce of the participant, and a predetermined financially-related event.

2. The media of claim 1 wherein the instructions further comprise storing information relating to two or more accounts of the first participant at the financial institution.

3. The media of claim 1 further comprising three or more participants.

4. The media of claim 1 wherein the first participant account at the financial institution satisfies a set of predetermined conditions.

5. The media of claim 1 wherein the instructions further comprise storing information pertaining to the privileges of a first participant with respect to a second participant account at the financial institution.

6. The media of claim 5 wherein the privileges of the first participant with respect to the second participant account at the financial institution satisfy predetermined conditions.

7. The media of claim 5 wherein the privileges of the first participant with respect to the second participant account at the financial institution include viewing privileges.

8. The media of claim 5 wherein the privileges of the first participant with respect to the second participant account at the financial institution include transacting privileges.

9. The media of claim 8 wherein the transacting privileges of the first participant include executing an automated transaction from the first participant account to the second participant account.

10. The media of claim 9 wherein the automated transaction is recurring.

11. The media of claim 9 wherein the automated transaction is executed upon the modification of the second participant account, the modification that has been selected by the first participant.

12. The media of claim 8 wherein the transacting privileges of the first participant include bill paying.

13. The media of claim 1 further comprising authorizing a first participant to transfer loaned funds to a second participant account at the financial institution.

14. The media of claim 13 wherein the first participant may select the account within which the second participant is to repay the loaned funds.

15. The media of claim 13 wherein the first participant may select the interest rate of the loaned funds.

16. The media of claim 13 wherein the interest accrued may be deposited in a first participant account.

17. The media of claim 13 wherein the interest accrued may be deposited in an account selected by the first participant.

18. The media of claim 1 wherein the threshold is additionally characterized by an equivalent sum of deposited finds within a single participant account at the financial institution.

19. The media of claim 1 wherein the threshold is predetermined.

20. The media of claim 1 wherein a participant satisfies predetermined conditions in order to enable the participant eligibility status to be changed when the threshold is met.

21. The media of claim 1 wherein the threshold is additionally characterized by the credit history of one or more participants and the credit history of the second participant is modified based on the credit history of the first participant.

22. The media of claim 1 wherein the eligibility status includes the eligibility to receive a service.

23. The media of claim 1 wherein the eligibility status includes the eligibility to receive a product.

24. The media of claim 1 wherein the eligibility status includes the eligibility to receive a product with a preferred pricing.

25. The media of claim 1 wherein the eligibility status includes the eligibility to receive a service with a preferred pricing.

26. The media of claim 1 wherein the characteristics of the threshold are personalized for the participants by a banking representative.

* * * * *